(12) United States Patent
Fuhrmann et al.

(10) Patent No.: US 7,035,224 B2
(45) Date of Patent: Apr. 25, 2006

(54) ACTIVITY DETECTION IN A STAR NODE WITH A PLURALITY OF COUPLED NETWORK NODES

(75) Inventors: Peter Fuhrmann, Aachen (DE); Wolfgang Budde, Aachen (DE); Hendrik Boezen, Nijmegen (NL); Patrick Willem Hubert Heuts, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 935 days.

(21) Appl. No.: 09/923,609

(22) Filed: Aug. 7, 2001

(65) Prior Publication Data

US 2002/0048274 A1 Apr. 25, 2002

(30) Foreign Application Priority Data

Aug. 10, 2000 (DE) ................................ 100 39 838

(51) Int. Cl.
*H04J 1/16* (2006.01)
*H04J 3/14* (2006.01)

(52) U.S. Cl. ...................... 370/252; 370/254; 370/425; 709/232; 709/252

(58) Field of Classification Search ............... 370/352, 370/354, 407, 425, 446, 447, 462, 255, 257, 370/230.1, 241, 242, 248, 250, 252, 254; 709/230, 232, 244, 252; 359/333; 385/46, 385/15, 24–25; 398/61–64

See application file for complete search history.

(56) References Cited

U.S. PATENT DOCUMENTS

| 4,663,748 A | * | 5/1987 | Karbowiak et al. ......... 370/224 |
| 4,700,344 A | * | 10/1987 | Kaino et al. ................. 370/240 |
| 4,781,427 A | * | 11/1988 | Husbands et al. ............ 385/24 |
| 5,073,982 A | * | 12/1991 | Viola et al. .................... 398/61 |
| 5,127,067 A | * | 6/1992 | Delcoco et al. ............... 385/24 |
| 5,161,153 A | * | 11/1992 | Westmore .................... 370/407 |
| 5,434,861 A | * | 7/1995 | Pritty et al. .................. 370/449 |
| 5,889,600 A | * | 3/1999 | McGuire ...................... 398/50 |
| 6,000,003 A | * | 12/1999 | Allen et al. .................. 713/320 |
| 6,198,722 B1 | * | 3/2001 | Bunch ......................... 370/229 |
| 6,219,040 B1 | * | 4/2001 | Kotha et al. ................. 345/211 |
| 6,233,689 B1 | * | 5/2001 | Allen et al. .................. 713/320 |
| 6,278,713 B1 | * | 8/2001 | Campbell et al. ........... 370/417 |

OTHER PUBLICATIONS

"TTP, Drive by Wire in Greifbarer Nahe", by Dr. Stefan Poledna et al., Electronik, No. 14, 1999, pp. 36-43.

* cited by examiner

*Primary Examiner*—Ajit Patel
*Assistant Examiner*—Chirag Shah

(57) ABSTRACT

The invention relates to a network comprising a plurality of network nodes and one star node, which star node is provided for the direct coupling of at least two network nodes. The star node comprises a plurality of star interfaces which are assigned to at least one network node and which comprise each an activity detector for detecting activities in the message signal coming from the assigned network node and for transferring the message signal from the assigned network node to the other star interfaces or from another star interface to the assigned network node in dependence on at least one activity.

6 Claims, 7 Drawing Sheets

ACTIVITY DETECTION IN A STAR NODE WITH A PLURALITY OF COUPLED NETWORK NODES

Figure 1:
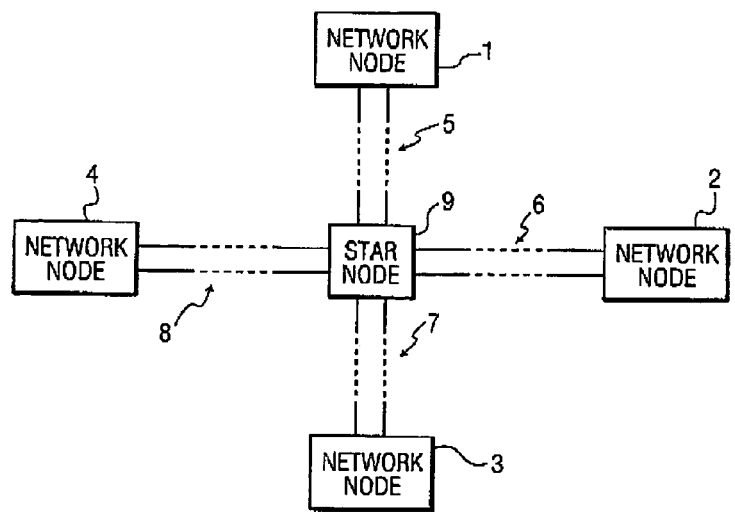

The invention relates to a network comprising a plurality of network nodes. Such networks may be used, for example, in motor vehicles, in aerotechnics and aerospace engineering, in industrial automation (for example, sensor systems) and domestic automation (for example, lighting technology, alarm systems, central heatings, climatic control, and so on).

In such a network for motor vehicle technology, for example, the TTP protocol (TTP=Time-triggered Protocol) known from the journal "Elektronik", no. 14, 1999, pp. 36 to 43 (Dr. Stefan Polenda, Georg Kroiss: "TTP: "Drive by Wire" in greifbarer Näahe") may be used. This protocol enables a reliable data transmission and may therefore also be used in networks for safety-related devices (for example, brakes). In the article mentioned above, a bus system is mentioned as a network structure.

It is an object of the invention to provide another network comprising a plurality of network nodes.

The object is achieved by a network of the type defined in the opening paragraph having the following characteristic features:

the network has a plurality of network nodes and one star node, which star node is provided for the direct coupling of at least two network nodes and includes a plurality of star interfaces which are assigned to at least one network node and which include each an activity detector for detecting activities in the message signal coming from the assigned network node and for transferring the message signal from the assigned network node to the other star interfaces or from another star interface to the assigned network node in dependence on at least one activity.

The invention relates to a network comprising a plurality of network nodes which are at least partly coupled to one another in a star node. If a network node likes to send a message, this is signaled to a star interface in the star node. This signaling may be a certain activity faded into the message signal of the network node, which activity calls forth a pilot signal superimposed by the message. For example, this activity may be performed by a change of level which the star interface on the assigned connection can flawlessly distinguish from the rest level of the line.

According to the invention a star interface which is assigned to at least one network node comprises an activity detector for detecting an activity in the message signal of the assigned network node. First a send request is to be recognized in the assigned star interface. This recognition reacts to a signal activity on the line on which the message signal is transported and continuously verifies whether the send node also further generates activities, or whether the end of the sending activity has been reached, respectively.

In dependence on the sequence of the activities, the message signal is transferred to the other network nodes via their assigned star interfaces. For this purpose, for example, switchable amplifiers are connected in the star node. In a network having high data rates and many network nodes which exchange data among each other, it is necessary for the star node to often and very rapidly perform a reconfiguration of the amplifiers in the star node. This must take place in dependence on the respectively current send node.

With the invention the requirement of a shortest possible configuration time and a high robustness to disturbances is satisfied, which disturbances do not lead to an unintentional configuration.

These and other aspects of the invention are apparent from and will be elucidated with reference to the embodiments described hereinafter.

Figure 2:
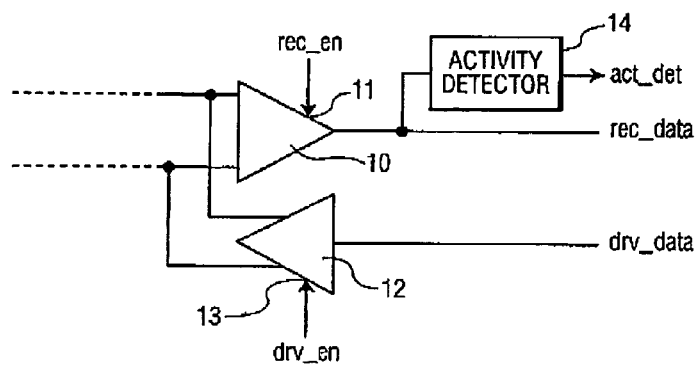
Figure 3:
Figure 4:
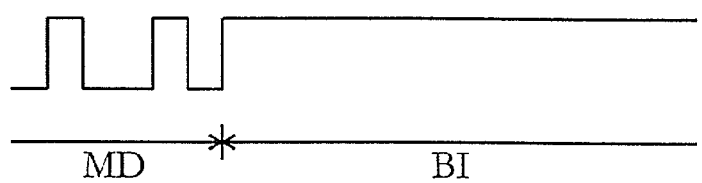
Figure 5:
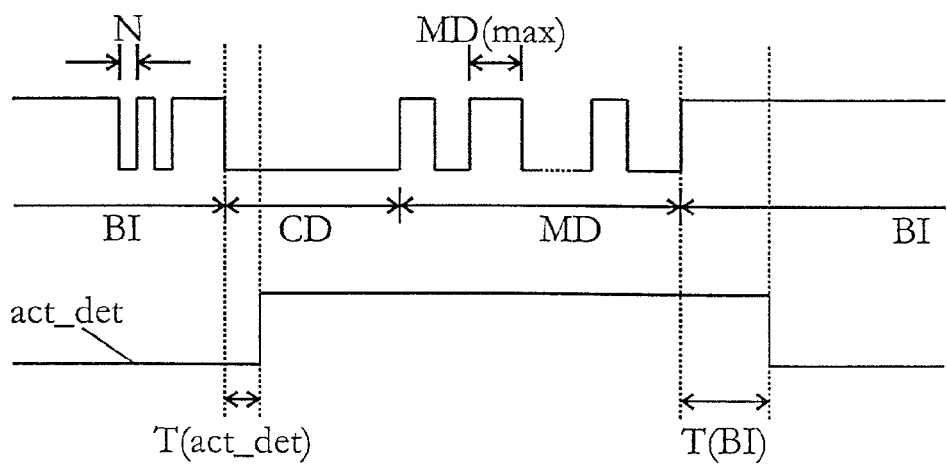
Figure 6:
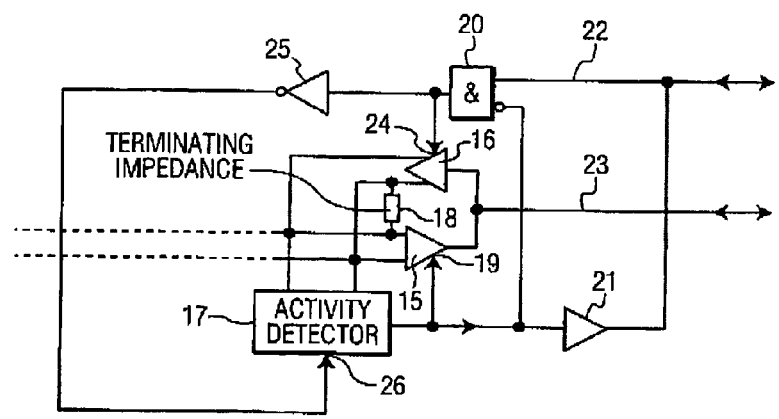
Figure 7:
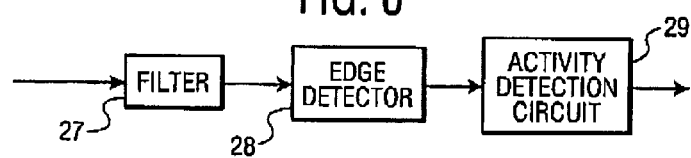
Figure 8:
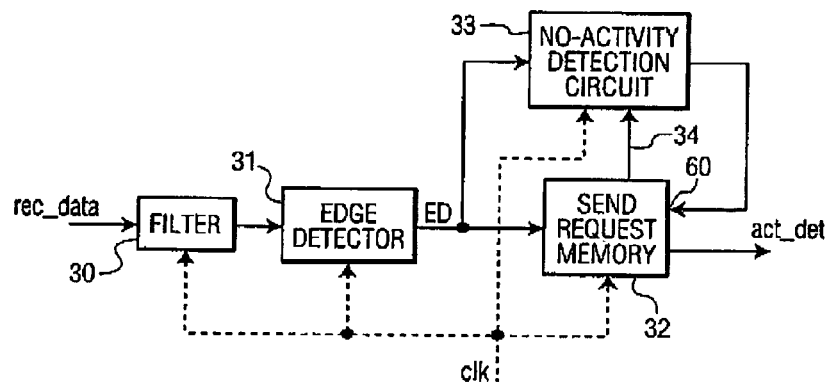
Figure 9:
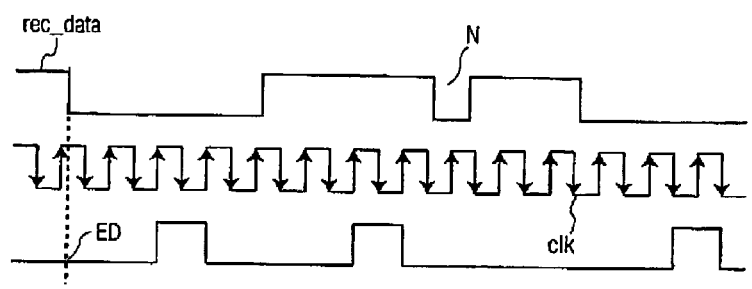
Figure 10:
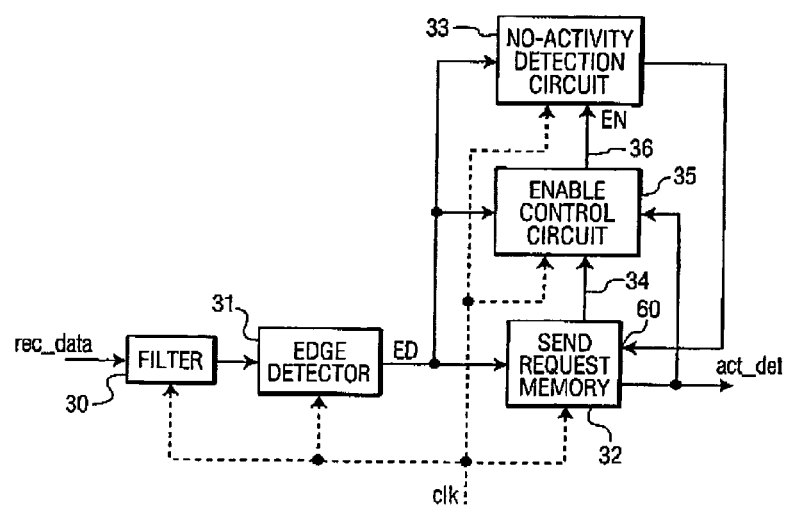
Figure 11:
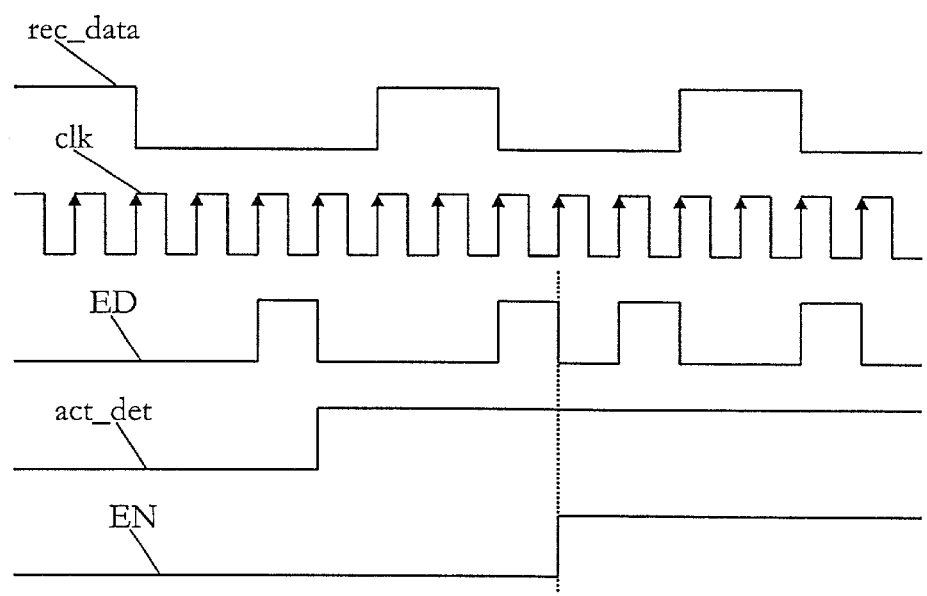
Figure 12:
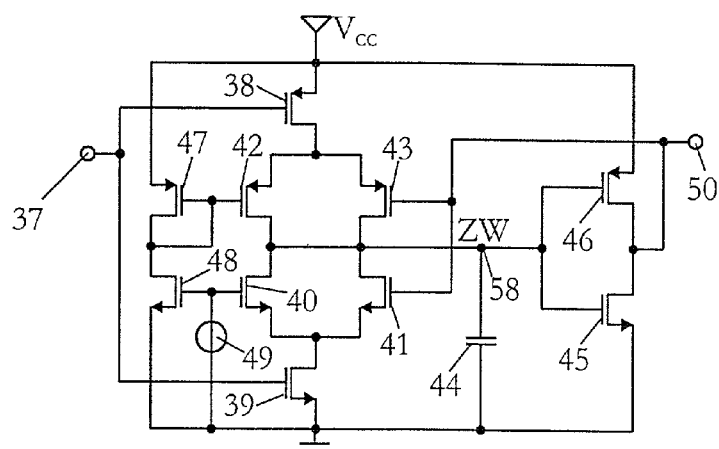
Figure 13:
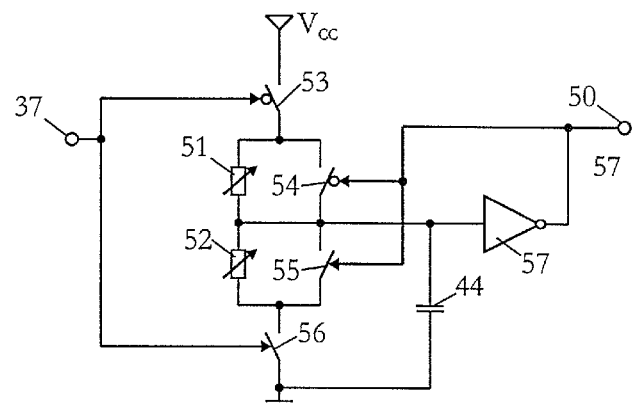
Figure 14:
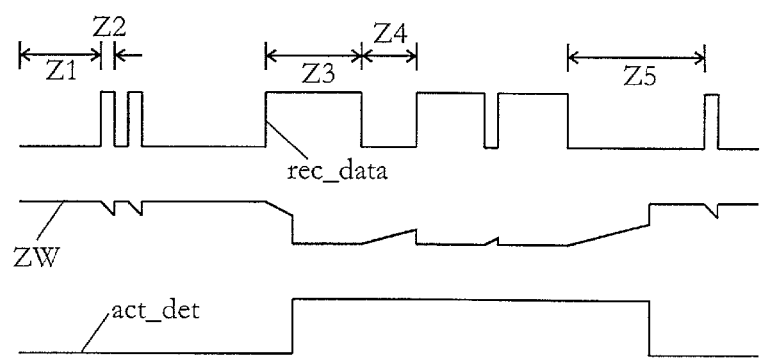

In the drawings:

FIG. 1 shows a network in a star structure comprising a plurality of network nodes which are coupled via an active star node, FIG. 2 shows a basic circuit diagram of a star interface in a star node, FIGS. 3 to 5 show various signal waveforms which may occur in the star interface shown in FIG. 2, FIG. 6 shows an embodiment of a star interface, FIG. 7 shows a function diagram of an activity detector to be used in the star interface, FIGS. 8, 10, 12 and 15 show various embodiments of an activity detector, FIGS. 9, 11 and 14 show various signal waveforms in the activity detectors shown in FIGS. 8, 10 and 12, and FIG. 13 shows a function diagram of the analog activity detector shown in FIG. 12.

An example of embodiment of the network according to the invention is shown in FIG. 1. This network comprises, for example, four network nodes 1 to 4 which are coupled to one another via twisted pair lines 5 to 8 provided for a symmetrical signal transmission via an active star node 9. The active star node 9 performs a line adaptation so that the line pairs 5 to 8 are terminated in the active star node 9 by the characteristic impedance and the signals transmitted by the network nodes 1 to 4 are analyzed. If the line pairs 5 to 8 were connected to one another without the active star node 9, there would be a mismatch for each line pair in the star node as a result of an impedance jump from $Z_0$ to $\frac{1}{3}Z_0$, which mismatch is caused by the respective parallel combinations of the other line pairs.

It is also possible that instead of line pairs 5 to 8 optical fibers suitable for the optical signal transmission are used. In that case an electro-optical or optoelectrical converter would be necessary in the network nodes 1 to 4 and in the star node 9.

The active star node 9 comprises for each line pair 5 to 8 a star interface which enables a transfer of a message from a sending network node to all the other network nodes connected to the active star node. The basic circuit diagram of such a star interface is shown in FIG. 2. A line pair 5 to 8 is coupled to the inputs of a switchable amplifier 10 (first switching element), which has a switching input 11, and to the outputs of a further switchable amplifier 12 (second switching element), which has a switching input 13. On the output of the switchable amplifier 10 a signal rec_data is available and on its switching input 11 a signal rec_en. To the output of the amplifier 10 is coupled an activity detector 14, which analyzes the output signal rec_data. The input of the switchable amplifier 12 receives an input signal drv__data. Its switching input 13 receives the signal drv_en. The activity detector 14 may also be connected upstream of the amplifier 10 if it has its own receiver amplifier and a switching input for switching off the activity detection.

The activity detector 14 of a star interface is used for detecting certain activities in a signal, which signal is applied to the assigned star interface by the assigned network node via the assigned line pair and indicates an oncoming transmission of a message. Such activity may mean, for example, a change of the signal level in a signal with certain subsequent signal changes. After the recognition of activity, the other star interfaces in the star node 9 are then switched so that they receive a message only from the star interface that receives a message from the assigned network node. This state of the star node is maintained until the assigned network node has completely sent its message. For this purpose, continuous checks are made in the star interface whether the message is still being sent i.e. whether activity can still be detected on the output of the switchable amplifier 10, or whether the sending operation was terminated (no activity). An end of the transmission is then recognized when no activity on the line is detected for a defined period of time. No special signal accompanying the message is used for controlling the star node 9, but the transmitted message itself causes the activity detector 14 to maintain the once formed star configuration (setting of the switchable amplifiers 10 and 12).

If a network node wishes to send a message, it has to generate a certain activity which is referred to as a send request. A signal waveform for a send request is shown in FIG. 3 by way of example. The signal has three phases, BI, CD and MD. By means of a level change at the end of phase BI and at the beginning of the phase CD, the network node indicates that it wishes to transmit a message. This level change is detected by the assigned star interface of the star node 9 and the switchable amplifier 12 of the assigned star interface and the switchable amplifiers 11 of the other star interfaces are switched off and the switchable amplifiers 12 of the other star interfaces are opened. If the other network nodes can receive the transmitted signal of the currently active network node, the phase MD (transmission of data) starts. The time CD which a star interface in the star node 9 needs for detecting the signal edge, distinguishing it from a disturbance and accordingly switching its own amplifier as well as the amplifiers of the other star interfaces, is to be paid attention to by the transmitting network node before it is allowed to send its message. This time interval CD depends on the selected implementation of the activity detection (selected activity detector 14) as well as the number of star nodes in the network. The star node 9 in FIG. 1 can be connected not only to a network node but also to at least a further star node to which further network nodes are connected. In that case the send request is to be transferred from the star node 9 to the second star node and the configuration time of this second star node belongs to phase CD. This is necessary for the message to be transmitted also to reach the network nodes that are connected to the second star node.

As mentioned above, the star interface shown in FIG. 2, which detects a change of level on the link to the connected network node, is provided for transferring this event to the other star interfaces of the star node 9. The control signal act_det generated by the activity detector 14 is used for controlling the switchable amplifiers 10 and 12. The activity detector 14 activates the control signal act_det after an activity has been detected. It remains active as long as a message travels through the network. The changes of level inside the message are then interpreted as an activity. If these changes fail to occur, the detector detects that the end of the message has been reached. A signal waveform having the phases MD and BI at the end of the message is shown by way of example in FIG. 4. The end of a message is featured by a constant level (phase BI). The maximum time intervals of a constant level inside the message (phase MD) must not lead to a switching-off of the control signal act_det. Only after a time interval in which no change of level has occurred for a certain period of time, is an end of the activity and thus the end of the message detected. The control line act_det is then deactivated. This event is transferred to the other star interfaces and the switched-on amplifiers of these star interfaces are switched off. The star node again changes to a state in which it can react to a new send request of an arbitrary network node and can provide a respective configuration of the data path in the network.

FIG. 5 shows a signal waveform by way of example of a network node with noise pulses and the control signal act_det generated therefrom of the activity detector 14. The maximum duration (N) of a noise pulse on the line, which is to be tolerated by a system, has an influence on the delay with which a send request is flawlessly detected. The delay T(act_det) is always larger than the tolerable noise pulse width, so that a distinction between the two events is possible anyway. This is taken into account by the activity detector 14.

The time duration MD(max) indicates the maximum time interval between two changes of level in one message. This maximum time interval depends on the selected coding and the data rate. A transmission method for which the time interval MD(max) cannot be determined, is unsuitable for using the detection of the activity for the control of active star networks. For example, in a transmission method which utilizes the NRZ coding, no changes of level can show up for an undetermined period of time.

The time interval T(BI) which the activity detector 14 needs to have for detecting the end of a transmission in a reliable manner must be larger than the maximum width MD(max) of a pulse during a message. Only in this way is it ensured that a connection is not terminated while a message is being transmitted.

The time interval T(BI) is to be determined so that it contains an additional security time interval. This reduces the probability of an erroneous detection of the end of a message transmission. This security time interval becomes necessary due to various system inaccuracies (for example, scanning errors during a digital edge detection, drift of component properties, and so on).

The principle of the activity detection can generally be applied to any type of signal transmission, for example, also to a single-line transmission and is not restricted to a symmetrical push-pull transmission. The decisive factor is the logic level which is applied to the activity detector.

An example of embodiment of a star interface is shown in FIG. 6. A line pair is connected to the inputs of a switchable amplifier 15, to the outputs of a further switchable amplifier 16, to an activity detector 17 and to a terminating impedance 18. The value of the terminating impedance 18 corresponds to the wave resistance and is therefore used for the correct line termination. When the activity detector 17 detects a send request, it generates an activated control signal which is applied to a switch input 19 of the switchable amplifier 15, to an inverting input of the AND gate 20 and, via an amplifier 21, to a line 22, which is connected to a non-inverting input of the AND gate 20. When the switchable amplifier 15 is enabled, it applies data to a data line 23 leading to a node. By this data line are also received data from the other star interfaces and transferred via the switchable amplifier 16 to the assigned line pair. The non-inverting output of the AND gate 20 is connected to a switch input 24 of the switchable amplifier 16 and, via an inverter 25, to a switch input 26 of the activity detector 17. An activated control signal coming from another star interface through the input 26 of the activity detector is used for blocking the activity detector.

The star interface shown in FIG. 6 is connected to the other star interfaces of a star node 9 via a wired OR combination (line 22). The amplifier 21 is realized in FIG. 6 as an open drain amplifier. The star interfaces of a star node 9 are in this case connected to the respective lines 22 and 23, so that, as a result, two circuit nodes are formed. In addition, a resistor is provided which is coupled, on the one hand, to the circuit node (line 22) and, on the other hand, to the logic 0 level. This resistor, together with the amplifier 21 of each star interface, forms the wired OR combination. An open collector circuit for the amplifier 21 is also possible when the logic combination is accordingly adapted by the AND gate 20 so that the wired OR combination is realized.

The functional structure of an activity detector 14 or 17, respectively, can be learnt from FIG. 7. This FIG. 7 contains a filter 27 for suppressing noise, an edge detector 28 and an activity detection circuit 29. The signal coming in on a line pair 5 to 8 or present on the output of a switchable amplifier is applied to the filter 27 for the noise pulse suppression. The filtered signal is analyzed by the edge detector 28. This edge detector informs the activity detection circuit 29 of an edge, i.e. an edge or level change, which circuit establishes whether a send request, a message or the end of a message is present. Depending on whether a send request, a message or the end of a message is present, the activity detection circuit 29 issues a control signal which becomes active when there is a send request, maintains this condition when there is a message and becomes inactive again after the end of a message has been detected. The functional structure of FIG. 7 can easily be shown in a digital example of embodiment which will be described hereinafter. With an analog example of embodiment, which has also been described, the functional blocks of FIG. 7 cannot so clearly be assigned.

An example of embodiment of a first digital activity detector is shown in FIG. 8. All the switching elements shown in FIG. 8 need to have a common clock (clk). The frequency of this clock signal is to be selected such that a sufficient oversampling of the data signal is guaranteed. If the shortest time interval of a constant level in the data stream is given by TB, the period of the clock signal in the star node must not exceed TB/2. The digital circuit shown in FIG. 8 includes a filter 30, an edge detector 31 and an activity detection circuit with a send request memory 32 and an no-activity detection circuit 33 for detecting the end of an activity.

The filter 30 prevents an edge, which was only generated by a brief noise pulse on the line pair, from being interpreted as a send request of the network node by the logic downstream in the circuit. Such a filter may comprise, for example, a shift register (for example, for three sample values) with a downstream evaluation logic. The downstream evaluation logic then forms part of the edge detector 31. The sample values pass through the shift register with always the oldest value dropping out as soon as the new sample value is taken in. The edge detector 31 interprets the values stored in the shift register to establish whether a change of level (signal edge) was actually caused by a transmitting network node. When a change of level from the second to the third sample value has taken place, an edge will not be evaluated as recognized until also the next sample value confirms this change of level (sample values two and three then have the same value). If only the second value is different i.e. the third sample value has the same value as the first sample value, this is interpreted as noise by the edge detector 31 and no edge recognition is signaled.

The filter 30 and the edge detector 31 may also form a more expensive arrangement. By including more sample values, the reliability can be enhanced with which a noise signal does not lead to the activity detection circuit being activated. However, the filter 30 and the edge detector 31 must not unrestrictedly include many sample values for the interpretation, because, as a result, also the time delay between the occurrence of the signal edge and the activation of the control signal is increased.

With the aid of FIG. 9, which shows the signal waveforms in the activity detector shown in FIG. 8, a possibility of reducing the delay caused by the filter while the frequency of the clock (clk) remains the same is explained in the following. The rising and falling edges of the clock (clk) are used for the signal sampling. As a result, the number of sample values in the same time interval can be doubled. The time interval between the occurrence of a level change in the input signal rec_data and the occurrence of a pulse in the output signal ED of the edge detector 31 is reduced in consequence. A pulse in the output signal ED is synchronized with the clock signal clk of the activity detection circuit and is present for one clock period.

It is to be observed that the filter 30 for the elimination of noise can also be realized in analog form or the digital filter 30 can be complemented by an upstream, analog filter (low-pass filter).

If an edge is recognized by the edge detector 31, i.e. its output signal ED is active, this information is stored in the send request memory 32. This memory may be fed, for example, via a synchronous set input. The output signal of the send request memory 32 is the control signal act_det, which—as explained above—is used for controlling its own star interface, but also other star interfaces of the star node 9.

The send request memory keeps the control signal act_det active until the no-activity detection circuit 33 has established the end of the activity and then resets the send request memory 32 via a synchronous reset input 60. The control signal act_det is then deactivated.

The no-activity detection circuit 33 verifies, after an activation by the send request memory via a link 34, whether further level changes (=activities) occur in the output signal. These level changes are shown, as described above, by pulses in the output signal of the edge detector 31. The signal rec_data in FIG. 9 contains noise N, which is recognized as such by the edge detector and does not call forth a pulse in the output signal of the edge detector 31. Only when a pulse no longer occurs for a given interval will the no-activity detection circuit 33 activate its output signal. This output signal then signals that the end of the current message has been reached and resets the send request memory 32.

The no-activity detection circuit 33 may be a counter which, after being triggered, starts incrementing its internal count with an adjustable granularity (count width). By laying down an overflow condition, a time interval can be defined after whose elapse the counter activates its output signal. The counter may obviously also be arranged as an "elapse" counter, which starts at a predefined initial count and, when a lower limit (for example, zero) is fallen short of, accordingly activates its output signal.

The output signal ED of the edge detector 31 is used for resetting the count to the initial state if the no-activity detection circuit 33 is realized as a counter. As a result, the "elapse" condition of the counter is not reached as long as the pulses in the output signal of the edge detector 31 follow each other at brief enough intervals. These intervals are defined by the type of coding of the message and the data rate. Also the occurrence of the longest possible time interval in a coded message, which time interval occurs between two level changes must not lead to the fact that the counter reaches its "elapse" count.

A dimensioning of this interval must thus be adapted to the type of message coding and the counter must be configured accordingly. This may be effected, for example, via a programmable "elapse" count or start count, respectively. It is also possible to set the count width for the clock (clk) by a configurable clock divider, so that the counter is supplied with an accordingly adapted count clock.

The enabling of the no-activity detection circuit 33 is effected by the send request memory via the connection 34. As explained above, the first edge on a line pair 5 to 8 (send request) is used for setting the switchable amplifiers in the star interfaces for the next transmission of messages. The send request is therefore always to be made a certain time interval before the actual message, so that the amplifiers in the star node 9 can be switched and connection paths in the star node are developed for sending messages from one network node to the other before the actual message transmission commences. Therefore, it is possible that between the first signal edge of the signal rec_data (compare FIG. 9: first pulse in the output signal ED of the edge detector 31) and the first signal edge caused by the message (see FIG. 9: second pulse in the output signal ED of the edge detector 31) a time interval elapses, which is larger than the defined time interval of the no-activity detection circuit 33. The no-activity detection circuit 33 would in this case again terminate a connection before the message was begun by the sending network node. This may be avoided by an additional enable control circuit 35. This does not permit the no-activity detection circuit 33 to be enabled via a link 36 (see FIG. 10: enable signal EN) until the second level change in the signal rec_data occurs.

FIG. 11 shows various signal waveforms in the activity detector shown in FIG. 10. As appears from this Figure, the enable signal EN for the no-activity detection circuit 33 will not be activated until the first signal edge of the data message occurs. The no-activity detection circuit 33 thus first probes from the beginning of the message whether the defined interval without an activity can be recognized in the signal rec_data.

A further example of embodiment of an analog activity detector is shown in FIG. 12. When an analog activity detector is used in the star node, no clock source is necessary. The analog activity detector receives on its input 37 the signal rec_data, which is led to the gate terminal of a P-channel MOS field effect transistor 38 and to the gate terminal of an N-channel MOS field effect transistor 39. The source terminal of the transistor 39 is connected to ground and its drain terminal to the source terminals of two N-channel MOS field effect transistors 40 and 41. The source terminal of the transistor 38 is connected to a voltage supply $V_{CC}$. The drain terminal of the transistor 38 is connected to the source terminals of two P-channel MOS field effect transistors 42 and 43, whose drain terminals have node 58 in common with the drain terminals of the transistors 40 and 41, a terminal of a capacitor 44 and the gate terminal of an N-channel MOS field effect transistor 45 and the gate terminal of a P-channel MOS field effect transistor 46. The gate terminal of the transistor 42 is connected to the gate terminal and the drain terminal of a P-channel MOS field effect transistor 47 and to the drain terminal of an N-channel MOS field effect transistor 48. The source terminal of the transistor 47 is connected to the power supply $V_{CC}$. The gate terminal of the transistor 48 is connected, on the one hand, to the gate terminal of the transistor 40 and, on the other hand, to a voltage source 49 ($V_{ref}$). The other terminal of the voltage source 49 is connected to ground as is the source terminal of the transistor 48.

The gate terminals of the transistors 41 and 43 and the drain terminals of the transistors 45 and 46 form the output 50 of the analog activity detector which delivers the control signal act_det. The source terminal of the transistor 46 is further connected to the voltage source $V_{CC}$ and the source terminal of the transistor 45 is connected to ground as is the other terminal of the capacitor 44.

The various functions of the transistors in the analog activity detector shown in FIG. 12 can be explained with the aid of the function diagram shown in FIG. 13. An adjustable resistor 51 is formed by the voltage source 49 and the transistors 42, 47 and 48 and an adjustable resistor 52 by the voltage source 49 and the transistor 40. The transistor 38 represents a switch 53, the transistor 43 a switch 54, the transistor 51 a switch 55 and the transistor 39 a switch 56. The transistors 45 and 46 form an inverter 57.

In contrast to the example of embodiment of the digital activity detector, it is assumed that on the input 37 there is a low voltage level (logic "0") when no messages are transmitted. With this first state Z1 (initial state) a low voltage level (rec_data=0, act_det=0) is present on the input 37 and on the output 50. The transistor 38 is turned on in this state and the transistor 39 is turned off. Since there is also a low voltage level on the output 50, in this state the transistor 43 is turned on and the transistor 41 is turned off. The capacitor 44 is charged via the transistors 38 and 43 to the positive supply voltage $V_{CC}$. On the node 58 between the drain terminals of the transistors 41 and 43 the signal Z2 is present (compare FIG. 14) which in this state has a high voltage level.

In the first state Z1, the switches 53 and 54 are closed and the switches 55 and 56 are opened in the function diagram shown in FIG. 13. A capacitor is charged via the switches 53 and 54.

If there is a change of level on the input 37, i.e. the signal has a high voltage level, the transistor 38 is turned off and the transistor 39 is turned on. A constant current will then flow via the drain terminal of the transistor 40, so that the capacitor 44 is discharged.

In the second state Z2 (compare FIG. 14), there are brief noise pulses. This means that a high voltage level (logic "1") briefly occurs in the signal rec_data. Such noise pulses are suppressed by a filter, which is determined by the capacitor 44 and the resistance of the transistor 40. If the noise pulses are very brief, the voltage on node 58 does not reach a switching threshold at which the output stage formed by the transistors 45 and 46 changes state, i.e. would bring the output 50 (signal act_det) to the high signal level. In consequence, the signal on the output 50 is deactivated in the case of brief noise pulses. After the end of the brief noise pulse, a low signal level on the input 37 leads to the fact that the capacitor 44 is recharged very rapidly via the turned-on transistors 38 and 43.

In the second state Z2 the switches 53 and 55 in the function diagram 13 are open and the switch 56 is closed. A discharging current flows from the capacitor 44 through the resistor 52 and the switch 56 to ground. The capacitor 44 and the resistor 52 determine the time constant of the discharge.

If the network node generates a send request (third state Z3), the voltage level on the input 37 is high at least for a time interval T(act_det) in length (compare FIG. 5, while considering the inverted input level compared to FIG. 14). In consequence, due to the discharge via the transistors 39 and 40, the voltage on node 58 drops below the switching threshold of the output stage with the transistors 45 and 46 (inverters). The output 50 changes to a high signal level i.e. the control signal denoting a send request is activated. The transistor 43 is turned off as a result and the transistor 41 is turned on. Via the transistors 41 and 39 the capacitor 44 is suddenly completely discharged (see signal waveform of ZW). The circuit thus reaches a stable state, which indicates an activity.

With the function diagram shown in FIG. 13 the third state Z3 can be explained as follows. After a change of the signal level on input 37 to logic "1", the switch 53 is opened (55 remains open for the time being) and the switch 56 is closed. A discharge current flows from the capacitor 44, through the resistor 52 and the switch 56 to ground. After the switching threshold determined by the inverter 57 has been reached, the switch 54 is opened and the switch 55 is closed. As a result, there is an amplified discharge to ground via the switches 55 and 56.

During the transmission of the actual message, there are time intervals in which there is a low voltage level on the input 37. These time intervals form part of the message and must therefore not lead to a change of the signal level on the output 50. As described, a low input level on the node 37 leads to the fact that the transistor 38 is opened and the transistor 39 is closed. Consequently, the capacitor can no longer discharge via the path formed by the transistors 39 and 41. Via the transistors 38 and 42 the capacitor 44 is charged with a constant current which depends on the voltage source 49 (fourth state Z4). The transistors 47 and 42 are to be dimensioned such that the current flowing through 42 in the fourth state is smaller than the current that has led to a discharge of the capacitor 44 via the transistor 40 in the second or third state, respectively. As a result, the duration can be set of the time interval for which a low voltage level on the input 37 does not yet lead to a change of the signal level on the output 50. The activity detector thus remains activated as long as the time intervals having a low voltage level do not exceed a certain duration.

The charging operation of the capacitor 44 via the transistor 42 is thus slower than a discharge via the transistor 40. Disturbances during the data transmission, just like the low voltage levels, do not lead to an influencing of the control signal act_det on the output 50. A subsequent high voltage level on the input 50 provides that the capacitor 44 is rapidly discharged via the transistors 41 and 39 and the recognition circuit remains in its stable state.

The fourth state Z4 can also be explained with reference to the function diagram 13. The resistor 51 is selected such that, after a change from a high to a low voltage level on the input 37, after the switch 56 is opened and the switch 53 is closed, the capacitor 44 is slowly charged by the voltage source $V_{CC}$.

Only when the input signal rec_data on the input 37 continues to have an uninterruptedly low voltage level, so that as a result of the permanent charging operation of the capacitor 44 the switching threshold of the output stage formed by the transistors 45 and 46 is exceeded, changes the output signal on the output 50 to a low signal level (fifth state Z5). This means that an end of the activity on the line was detected.

In the function diagram shown in FIG. 13 the switches 55 and 56 are opened and the switches 53 and 54 are closed in the fifth state Z5 after a switching threshold has been exceeded. The capacitor 44 is then charged via the switches 53 and 54.

To meet the requirements concerning a rapid reaction to a send request and a detection of the end of a message, which detection is adapted to the data rate and coding, the resulting resistances of the transistors 40 and 42 are to be dimensioned accordingly. The resistance of the transistor 40 (corresponds to the resistance 52 in FIG. 13), which determines the response time of the detector, is smaller than the resistance of the transistor 42 (resistance 51 in FIG. 13) which is normative for the time interval that is considered the end of the activity.

The voltage source 49 shown in FIG. 12 may be realized by a reference voltage source connected to a transistor diode circuit known per se.

The difference between time intervals occurring in the message and having a constant level and the turn-off requirement (an interval without an activity, which exceeds a defined length) is to be guaranteed by the dimensioning of various transistors—as explained above. The time intervals, however, depend on the data rate at which a transmission is effected. To nevertheless be able to flexibly set the activity detector shown in FIG. 12 to different data rates when the transistors have a fixed dimensioning, the voltage source 49 may be arranged programmably. Thanks to the adjustable charge current the charge time constant of the capacitor 44 can be configured. A programming of the activity detection circuit to a desired data rate may be realized at the voltage source 49, for example, by additional control lines for setting the reference voltage.

The transistor 47 may also be replaced by a voltage source. The capacitor 44 need not be present as an individual element, but may also be formed by the parasitic capacitances which form the input capacitances of the transistors 45 and 46.

Figure 15:
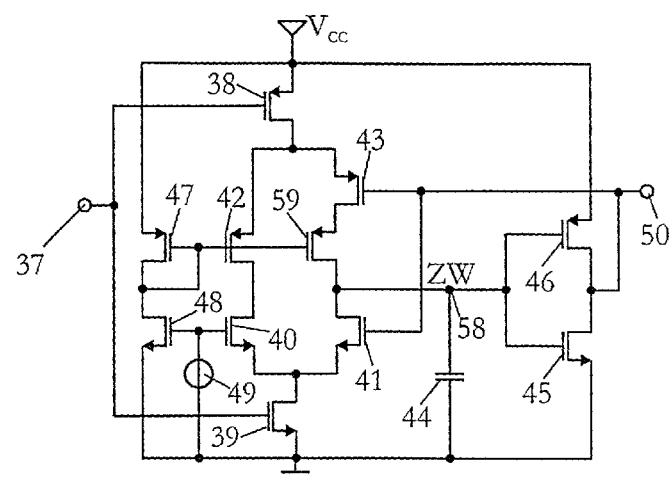

A further embodiment for the analog activity detection is shown in FIG. 15. Compared to FIG. 12, the circuit includes a further P-channel field effect transistor 59 whose source terminal is only connected to the drain terminal of the transistor 43, whose gate terminal is only connected to the gate terminal of the transistor 42 and whose drain terminal is only connected to the drain terminal of the transistor 41, the gate terminals of the transistors 45 and 46 and to a terminal of the capacitor 44. Compared to FIG. 12, FIG. 15 has no connection, on the one hand, between the drain terminals of the transistors 40 and 42 and the gate terminals of the transistors 45 and 46. The transistor 59 increases the time constant for the charging operation of the capacitor 44 i.e. it takes longer to increase the potential on node 58. This increases the immunity of the circuit to noise pulses on the line.

The invention claimed is:

1. A network comprising a plurality of network nodes and one star node, which star node is provided for the direct coupling of at least two network nodes, and includes a plurality of star interfaces which are assigned to at least one network node and which include each an activity detector for detecting activities in the message signal coming from the assigned network node and for transferring the message signal from the assigned network node to the other star interfaces or from another star interface to the assigned network node in dependence on at least one activity, the network characterized in that each star interface further includes a first and a second switching element, in that the first switching element in activated state passes a message from the assigned network node to the other star interfaces and the second switching element in active state passes a message from the other star interfaces to the assigned network node and in that the activity detector of a star interface activates the first switching element and deactivates the second switching element when a message occurs from the assigned network node and deactivates the first switching element and activates the second switching element when a message occurs from another network node.

2. A network as claimed in claim 1, characterized in that the activity detector includes an edge detector for detecting an edge or flank in the message signal and an activity detection circuit for establishing, based on the detected flank or edge, whether a send request, a message or the end of a message is present.

3. A network as claimed in claim 2, characterized in that the activity detection circuit includes a send request memory and an no-activity detection circuit, in that the send request memory changes its memory contents when an activity featuring a send request occurs, its memory contents form a control signal for the activation or deactivation of the switching elements and in that the no-activity detection circuit resets the send request memory after a certain period of time without the occurrence of an activity.

4. A network as claimed in claim 3, characterized in that the activity detection circuit includes an enable control signal which enables the no-activity detection circuit after a further activity featuring the send request.

5. A network as claimed in claim 1, characterized in that the activity detector includes a first and a second switching transistor, which are arranged in dependence on the message signal so that either the first or the second switching transistor is closed, and includes a capacitor which can be charged at least via the first switching transistor and discharged via the second switching transistor.

6. A network as claimed in claim 5, characterized in that the activity detector includes a third and a fourth switching transistor, which are arranged in dependence on the output signal so that either the third or the fourth switching transistor is closed, includes a first adjustable resistor connected in parallel to the third switching transistor and a second adjustable resistor connected in parallel to the fourth switching transistor, and includes an inverter coupled to the output, in that during an activity featuring a send request, the charged capacitor is discharged via the second and fourth switching transistors and at the end of a message the capacitor is charged via the first and third switching transistors.

* * * * *